United States Patent Office 3,015,663
Patented Jan. 2, 1962

3,015,663
1,3-CYCLOHEXANEDIONE BIS-(N-PYRIDINE-CARBOXYHYDRAZONES)
Markus Zimmermann, Riehen, Switzerland, assignor to G. D. Searle & Co., Chicago, Ill., a corporation of Delaware
No Drawing. Filed Sept. 29, 1959, Ser. No. 843,060
3 Claims. (Cl. 260—295)

The present invention relates to novel heterocyclic bishydrazones and, more particularly, to 1,3-cyclohexanedione bis-(N-pyridinecarboxyhydrazones) of the structural formula

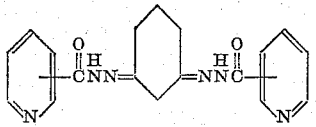

which possess tranquilizing properties not shared by the corresponding bishydrazones of open-chain diketones.

This invention is a continuation-in-part of my copending application, Serial No. 776,444, filed November 26, 1958.

The invention is not limited by the structural representation shown supra since it is apparent that the resonance forms with double bonds in the cyclohexane ring are included also.

The compounds of this invention can be manufactured by the condensation of the appropriate pyridinehydrazide with 1,3-cyclohexanedione. As a specific example of this process, isonicotinoylhydrazide (pyridine-3-carboxhydrazide) is reacted with 1,3-cyclohexanedione (dihydroresorcinol) to afford 1,3-cyclohexanedione bis-(isonicotinoylhydrazone). Suitable solvents or diluents such as methanol, ethanol and the like can be included in the reaction mixture.

The instant organic bases can be isolated conveniently as their non-toxic salts, i.e. hydrochloride, hydrobromide, citrate, tartrate, maleate, and the like.

The compounds of this invention are useful as a result of their valuable pharmacological properties. As stated supra, they are central nervous system depressants as a result of their ability to induce a state of tranquility. They are also anti-infective agents as evidenced by the fact that they inhibit the growth of *Bacillus subtilis* and prevent also the susceptibility to Coxsackie virus infection induced by cortisone administration. In addition, they are anti-emetic agents in consequence of their capacity to inhibit apomorphine-induced emesis.

The invention will appear more fully from the examples which follow. These examples are set forth by way of illustration only and it will be understood that the invention is not to be construed as limited in spirit or in scope by the details contained therein as many modifications in materials and methods will be apparent from this disclosure to those skilled in the art. In these examples temperatures are given in degrees centigrade (° C.). Quantities of materials are expressed in parts by weight unless otherwise noted.

Example 1

A mixture of 13.8 parts of nicotinic acid hydrazide, 5.6 parts of 1,3-cyclohexanedione, 50 parts of ethanol, and 4 parts of glacial acetic acid is heated at reflux for about 2 hours. The reaction mixture is cooled and treated with isopropanolic hydrogen chloride and the resulting precipitate collected by filtration and crystallized from aqueous ethanol-ethyl acetate to afford pure 1,3-cyclohexanedione bis-(nicotinoylhydrazone) trihydrochloride, M.P. 240–243° (dec.).

Example 2

A mixture of 27 parts of isonicotinic acid hydrazide, 11 parts of 1,3-cyclohexanedione, 40 parts of methanol, and 20 parts of ethanol is heated at reflux for about 2 hours, then allowed to stand at room temperature for about 16 hours. The reaction mixture is cooled and treated with excess isopropanolic hydrogen chloride, then heated for about 15 minutes. The mixture is evaporated to dryness in vacuo and the residue crystallized twice from aqueous ethanol to yield pure 1,3-cyclohexanedione bis-(isonicotinoylhydrazone) dihydrochloride monohydrate, M.P. 192–203°.

What is claimed is:
1. A compound of the structural formula

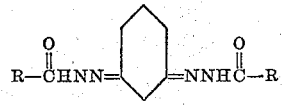

wherein R is C-pyridyl.
2. 1,3-cyclohexanedione bis-(N-nicotinoylhydrazone).
3. 1,3 - cyclohexanedione bis - (N -isonicotinoylhydrazone).

References Cited in the file of this patent
UNITED STATES PATENTS
2,808,360    Carrara _____ Oct. 1, 1957
FOREIGN PATENTS
196,408     Austria _____ Mar. 25, 1958
OTHER REFERENCES
Metze et al.: Berichte der Deut. Chem. Gesell., vol. 89, pages 2466–9 (1956).